H. A. BROWN.
SKIVING MACHINE.
APPLICATION FILED JAN. 5, 1914.
1,139,480.
Patented May 18, 1915.
4 SHEETS—SHEET 2.
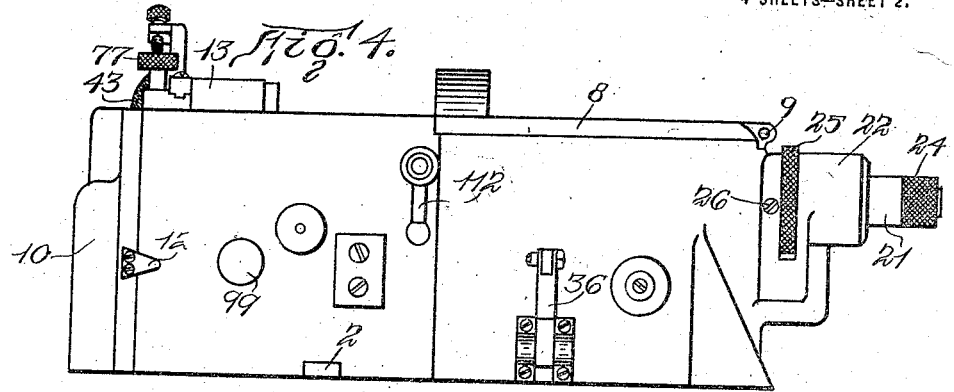
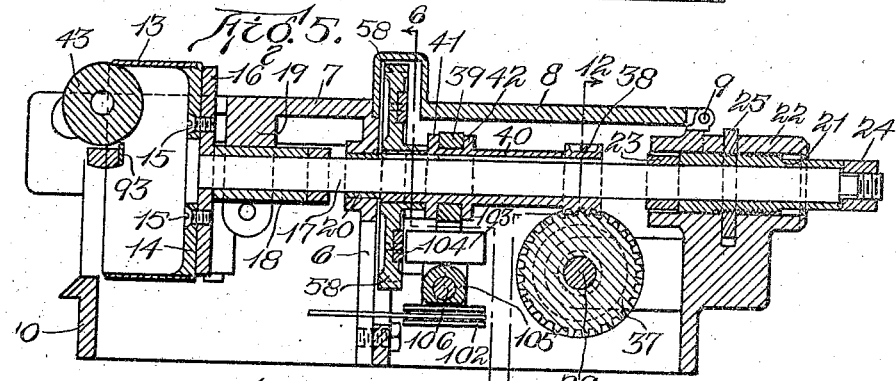
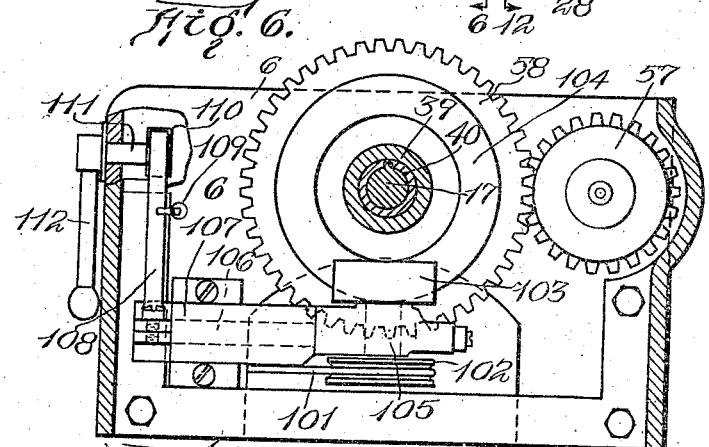
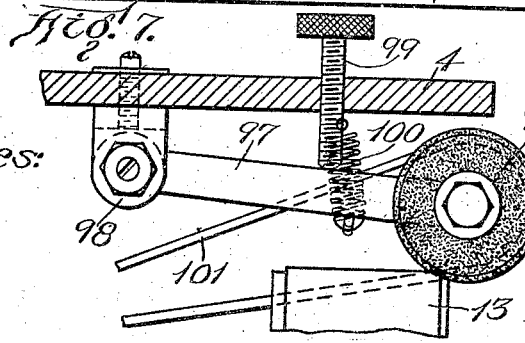
Witnesses:
Inventor.
Harold A. Brown

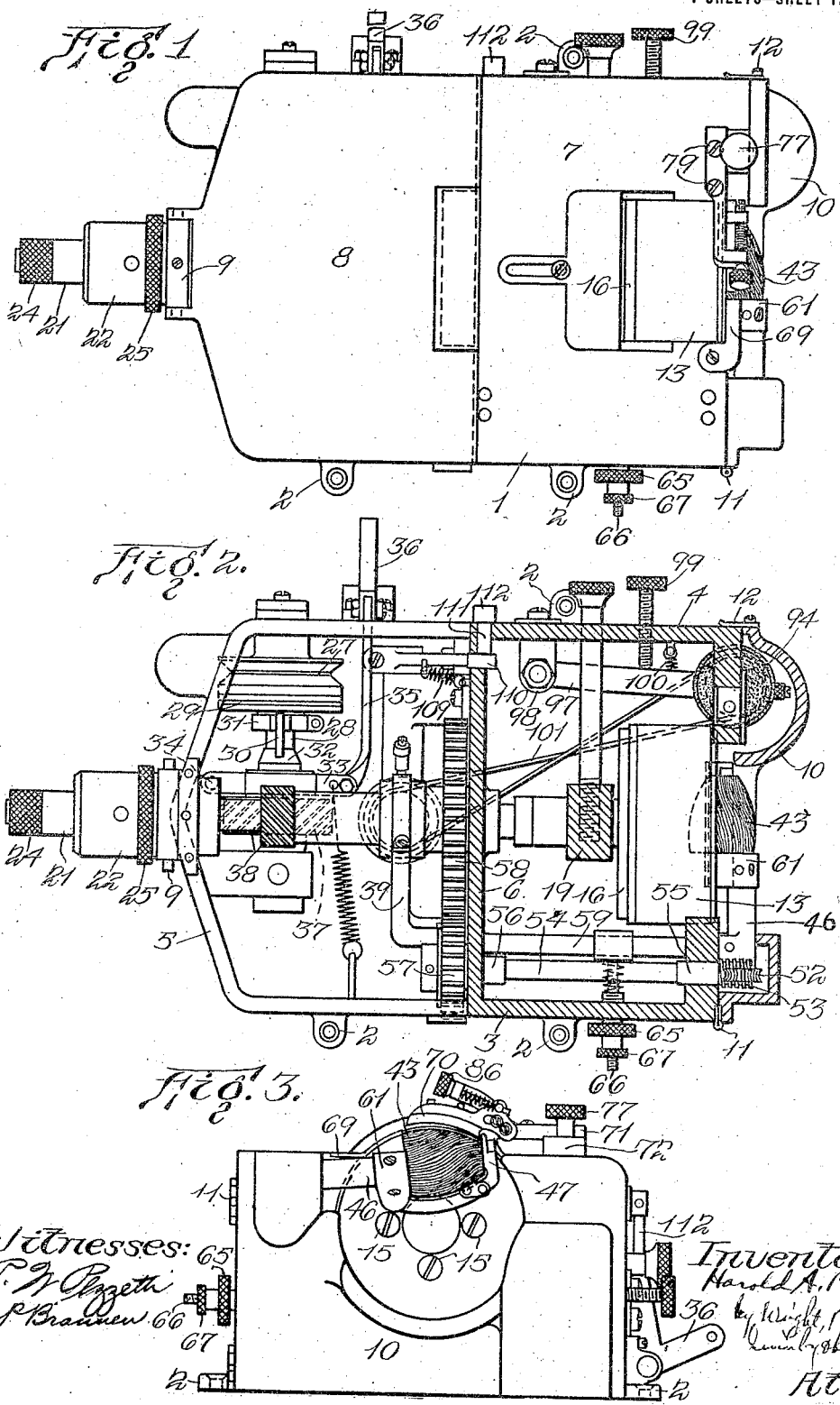
H. A. BROWN.
SKIVING MACHINE.
APPLICATION FILED JAN. 5, 1914.
1,139,480.
Patented May 18, 1915.
4 SHEETS—SHEET 1.

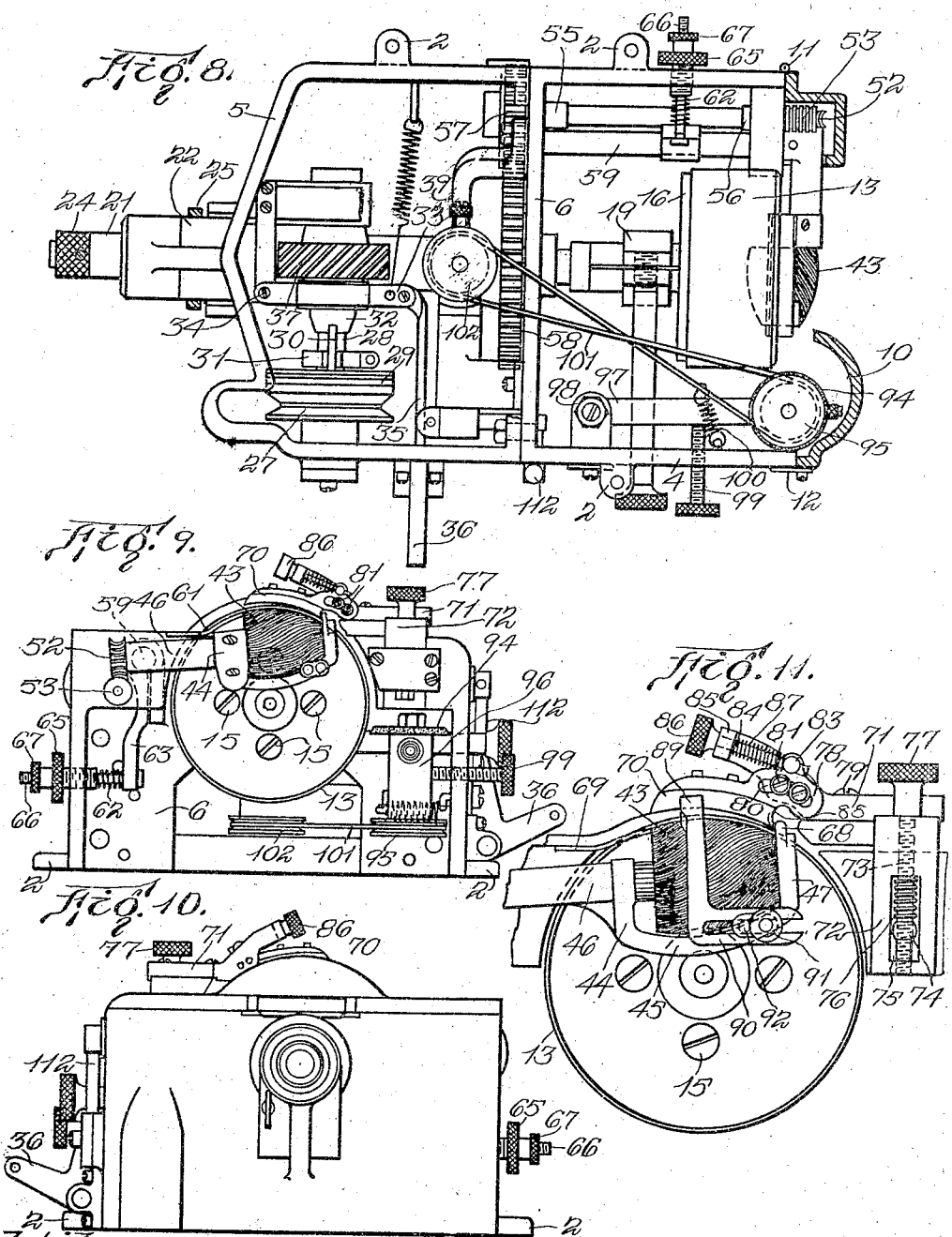

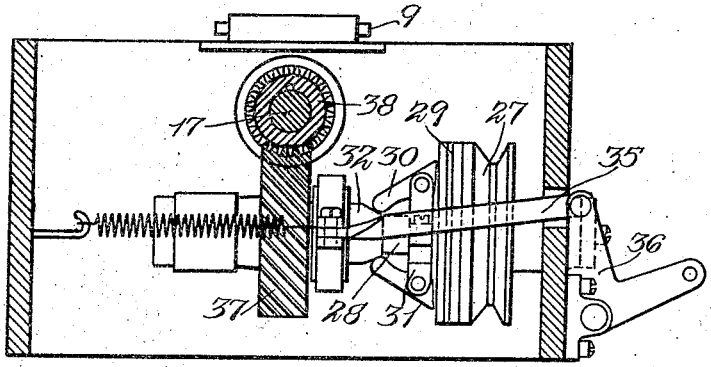
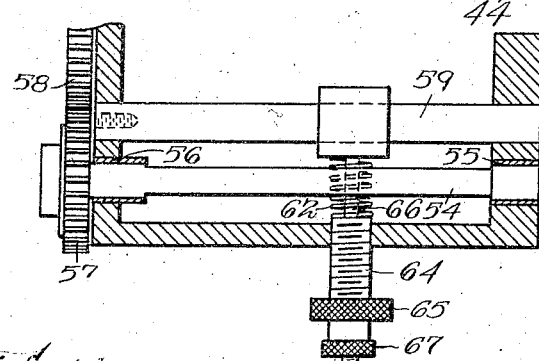
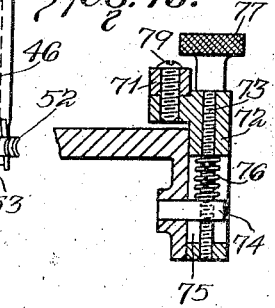
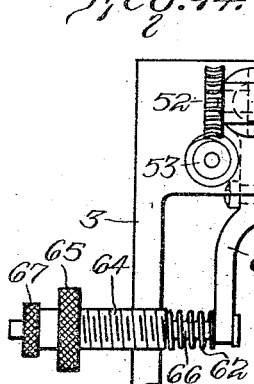
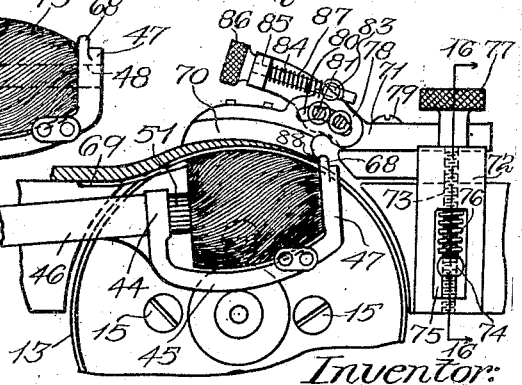

UNITED STATES PATENT OFFICE.

HAROLD A. BROWN, OF BROCKTON, MASSACHUSETTS, ASSIGNOR OF ONE-HALF TO JOHN BURDETT AND ONE-HALF TO ARTHUR B. ALDEN, BOTH OF BROCKTON, MASSACHUSETTS.

SKIVING-MACHINE.

1,139,480.  Specification of Letters Patent.  Patented May 18, 1915.

Application filed January 5, 1914. Serial No. 810,294.

*To all whom it may concern:*

Be it known that I, HAROLD A. BROWN, a citizen of the United States, and resident of Brockton, in the county of Plymouth and State of Massachusetts, have invented certain new and useful Improvements in Skiving-Machines, of which the following is a specification.

The present invention relates to machines for skiving leather and has for its object first to provide an improved and novel gaging means for such a machine by which the depth and bevel of the scarf cut in the leather may be accurately determined and varied; and further to provide various improvements in the cutter driving and work feeding mechanism, and means for making adjustments by which greater accuracy in operation may be secured than has been obtained hitherto, and such accuracy may be maintained under all conditions. The means by which these objects are secured and in which the essentials of my invention reside are fully explained in the following specification. In such specification and in the drawings forming a part of the same I have illustrated the preferred embodiment of means for carrying the objects of my invention into effect, without thereby intending to limit my invention in all respects and in all of the appended claims to the exact particulars of construction and arrangement shown and described.

In the drawings, Figure 1 is a plan view of a machine containing the preferred embodiments of the various features of my invention. Fig. 2 is a plan view of the mechanism of the machine, represented as though the top of the inclosing case had been removed. Fig. 3 is a front end elevation of the machine. Fig. 4 is a side elevation of the machine. Fig. 5 is a longitudinal section. Fig. 6 is a cross section and elevation looking forwardly from the line 6—6 of Fig. 5. Fig. 7 is a detail plan view of the grinder. Fig. 8 is an under plan view of the machine showing the front plate of the case in section. Fig. 9 is a front elevation of the machine with the front plate removed. Fig. 10 is a rear elevation of the machine. Fig. 11 is a detail elevation of the cutter, feed roll, and gaging means. Fig. 12 is a cross section and elevation of the parts on the line 12—12 of Fig. 5. Fig. 13 is a plan and horizontal section of the feed roll and the mechanism for driving it. Fig. 14 is a front elevation of the feed roll and associated parts. Fig. 15 is a view similar to Fig. 11 showing a different adjustment of the gaging means. Fig. 16 is a sectional view of a detail of the gage adjusting means taken on line 16—16 of Fig. 15.

The same reference characters used in the following description refer to the same parts in all the figures to which such characters are applied.

Referring to the drawings 1 represents a casing or box which forms at once the frame for supporting the moving parts of the machine and in the inclosing case which protects such parts and guards the operator of the machine from injury. Such case is adapted to be secured to a bench or table and has perforated lugs 2 adapted to receive screws or bolts for that purpose. The case which I have shown here has integral side walls 3, 4 shown in section in Fig. 2, a rear wall 5, an intermediate transverse web 6 and a top plate 7 (Fig. 5). These parts are all preferably formed as a single integral casting, and the part 7 is that portion of the top of the casing in front of the transverse web 6. The rear portion of the case is covered by a cover plate 8 united by a hinge 9 to the upper edge of the rear wall and adapted to be swung back to uncover the operating elements in that part of the case. The front of the case is closed by a front wall or door 10 united by a hinge 11 to the side wall 3 and adapted to be swung aside to give access to the knife grinder and other parts in the forward part of the case. The door is formed with an opening which permits escape of the chips produced by operation of the knife, while at the same time it protects the operator against danger of being cut by the knife. A latch 12 assists in holding the door closed. The web 6 is provided to stiffen the case and provide a support for certain of the operating parts, as will be presently described.

The machine here illustrated is of the type using a cylindrical knife, such knife being a hollow cylinder and having a cutting edge formed at one end. The knife is designated 13 and is best shown in Fig. 5. It is connected with or formed with a plate 14, constituting in effect a part of the knife structure, which is secured detachably by screws 15, or their equivalent, to a disk 16 mounted upon a shaft 17. Said shaft passes through a bearing bushing 18 contained in a lug 19 which hangs down from the top plate 7. The shaft is further supported and alined by a bearing 20 in the transverse web 6 and by a bushing 21 in a sleeve 22 formed in the rear wall of the case. The shaft carries a collar 23 fixed upon it at one end of the bushing 21 and a nut 24 threaded to it at the other end of the bushing, and the bushing itself is adapted to be moved endwise in the sleeve 22 so as to adjust the knife by moving the shaft endwise. For the purpose of making such adjustments I provide a nut 25 set into a transverse slot in the sleeve 22 and engaged with external screw threads on the bushing 21. The latter is prevented from rotating by any suitable means, such as a key or screw 26 mounted in the sleeve 22 and entering a longitudinal slot in the bushing. The purpose of this adjustment is to maintain the edge of the knife in the proper position even after a large amount of the substance of the knife has been removed by grinding. By reference to Fig. 5 it will be seen that almost the entire length of the knife from its edge to the plate 14 may be gradually removed by grinding before the knife becomes useless. The extent of adjustment permitted by the bushing 21 is enough to bring the edge of the knife into its operating position as long as enough material of the knife remains to be useful. Power to drive the knife is furnished by a pulley 27 loosely mounted on a transverse shaft 28 in the rear part of the case and adapted to be rotated by a belt from any suitable source of power. Such pulley may be made fast to the shaft by a clutch 29 of suitable character. In the present illustrated form of the invention the clutch is a disk keyed to the shaft and made operative or inoperative by cam levers 30 pivoted on a collar 31 and operated by a cone 32 in a well known manner. The cone is engaged with a lever 33 pivoted at 34 at a fixed point and connected by a link 35 with a bell crank 36, which is pivoted to the outside of one of the walls of the case and is adapted to be connected to a treadle or other suitable device for actuation by the operator. The shaft 28 carries a spiral gear 37 fixed upon it and meshing with a conjugate spiral gear 38 splined upon the shaft 17, whereby said shaft and the cutter are positively rotated whenever the shaft 28 is driven. The splined connection between the shaft 17 and gear 38 permits the above described longitudinal adjustment of the shaft 17 without displacing the gear. The latter is held in position by a bracket 39 fixed to the transverse web 6 and surrounding a sleeve 40 with which the gear 38 is connected or of which it is made a part. Flanges 41 and 42 on the sleeve embrace the bracket 39 and hold the sleeve and gear 38 against endwise movement.

The work is fed to the upper side of the cutter by a feed roll 43 which rotates upon an axis transverse to the axis of the cutter and has a roughened convexed surface so formed that the feed roll may lie within the circumference of the cutter and close to the edge thereof at all points. In other words the longitudinal curvature of the roll is the same as the circular curvature of the cutter. The feed roll is mounted on an arm or bracket 44 which has an offset portion 45, a tubular part 46 and an end piece 47. The offset part 45 is offset both vertically as appears from Figs. 11 and 15, and horizontally as appears from Fig. 13. The ends of the offset part support rotatably a shaft 48 to which the roll and a pinion 49 are secured. The tubular portion 46 of the bracket contains a shaft 50 which carries on the end next to the feed roll, a pinion 51 meshing with the pinion 49, and on its opposite end carries a worm wheel 52 which is driven by a worm 53 on a shaft 54, said shaft being supported in bearings 55 and 56 in the front of the case and in the web 6, respectively, and having fixed upon it a gear 57 which meshes with a gear 58 on the cutter shaft 17. Gear 58 is positively splined upon the cutter shaft so that a positive motion is given to the feed roll at a speed which is much less than but proportional to the speed of rotation of the cutter. The driving transmission shaft 54 for the feed roll is at one side of the cutter, as appears from Figs. 2, 8, and 9, and so also is the rock shaft 59 to which the bracket 44 carrying the feed roll is secured. The tubular part 46 of the bracket crosses the edge of the knife and the offset part of the bracket is contained partly in the space surrounded by the knife. The described formation of the bracket brings the axis of the roll into the plane of the cutting edge of the knife, which is an important feature of the invention. Thereby the surface travel of the roll due to rotation thereof takes place in a direction perpendicular to the line in which the cutting edge of the knife travels and causes the material which is acted upon in the machine to be fed squarely toward the knife. If the feed roll were mounted directly on the shaft 50 which crosses the edge of the knife, and not on a shaft parallel thereto, the roll would either be located in front of the knife edge, or be required to rotate in a direction inclined in a direction to which it is desirable to feed the work. A cover 61 is secured to the bracket so as to cover and protect the pinions 49 and 51. This cover is shown in Figs. 3 and 9, but is omitted from the other figures in which the feed roll is shown in detail. The feed roll is held up to the knife by a spring 62 which presses against an arm 63 (Fig. 14) detachably clamped on the rock shaft 59, and reacts against an adjustable abutment 64 preferably formed as a tubular screw threaded through the side wall 3 of the case and having a knurled head 65 by which it may be rotated. A rod 66 which is engaged with the arm 63 passes through the tubular screw 64, and carries on its threaded outer end an adjusting nut 67. The screw 64 and nut 67 together determine the position of the feed roll and the tension with which the latter holds the work up to the knife. The screw 64 regulates the compression of the spring 62, while the nut 67 which abuts against the outer end of the screw positively determines the location of the roll. By so adjusting the roll the thickness of the skiving removed from the work is adjusted and altered.

An important feature of the invention relates to a gaging means used in connection with the feed roll and knife. Part of this gaging means consists of a lip 68 which rises from the end member 47 of the roll holding bracket adjacent to one end of the feed roll. Another portion of the gaging means is a guard plate 69 fixed to the top of the casing and extending therefrom in front of the edge of the knife as far as the opposite end of the feed roll from the lip 68. These gaging means limit the width of the skiving to the length of the roll. The depth and angle of the scarf formed on the skived edge of the piece are determined by a top gage 70 which overlies the upper, that is, the operative side of the feed roll. This top gage is supported by an arm 71, which is fastened to a vertical slide 72 set into a guideway in the front of the case and adapted to be raised and lowered by a screw 73 which is contained in the slide and is threaded through a stud 74 fixed to the casing and projecting into a slot 75 in the slide. A spring 76 bears against the stud 74 and against the upper end of the slot and tends to raise the slide. The screw has a knurled head 77 for manual operation. It will be readily understood that by rotating the screw in one direction or the other the slide may be raised or lowered, carrying the top gage away from or toward the feed roll. The operative portion of the top gage is its under surface which is curved on an arc substantially equal to the radius of the knife. The gage has a wing 78 overlapping the arm 71, which latter is rigidly secured by screws 79 to the slide 72. The wing 78 has a slot 80 through which pass two screws 81 which are threaded into the arm 71. The wing also carries a stud 83 having a transverse threaded aperture with which is engaged a screw 84 passing through a lug 85 on the arm 71 and having a head 86 for manipulation. A spring 87 surrounds the screw 84 and bears against the stud 83 and lug 85, taking up backlash and holding the top gage in the exact position given it by the screw. The screws 81 are merely guides and are not intended to bind the gage in any particular position, consequently the adjustments of the regulating screw 84 cause the top gage to move in a manner determined by the slot 80. This slot is curved, and consequently such movements are swinging movements about the center of curvature of the slot. Such center of curvature is the end or tip 88 of the top gage, so that adjustments of the screw 84 have the effect merely of raising and lowering one end of the gage without altering the position of the other end. The gage as a whole, however, is raised and lowered by the screw 73. By means of these two adjustments the skived edge of a piece of leather may be made to have any desired thickness and any desired angle of bevel. The gage lip 68 of the roll-holding bracket extends past the end 88 of the top gage and is approximately parallel to the up and down movement thereof in all positions of the roll. It is sufficiently close to the end of the top gage in all adjustments to prevent the edge of even a thin and flexible piece of leather passing between the lip and top gage. Another portion of the gaging means which may be used or not at will, is an edge gage 89 having a slotted base 90 which is adapted to be slipped over the shank of a screw 91 and a stud 92 which project from the side of the roll-holding bracket. The stud 92 is merely to guide the gage and prevent it from rotating about the screw 91. Said screw has a head which may be turned between the thumb and finger of the operator and clamps the edge gage in position. This gage is adapted to be adjusted longitudinally of the roll and serves to limit the width of the skived edge of the work when such width is designed to be less than the length of the roll.

A stripper 93 is provided on the rear side of the bracket arm 45 close to the under surface of the feed roll (see Fig. 5) to remove any bits or skivings of leather which may adhere to the roll after passing between the same and the knife. The skivings fall into the space surrounded by the knife, which is entirely open at the front end, and thence escape through the opening or recess in the hinged front wall 10, which is substantially flush with the edge of the knife on the lower side thereof.

The knife may be sharpened whenever necessary by a grinding wheel 94 which is mounted at one side thereof as shown in Figs. 2, 7, 8, and 9. The grinding wheel is fixed upon the same shaft with a driving pulley 95, and this shaft has a bearing in a sleeve 96 formed on a swinging arm 97 pivoted to a bracket 98 fixed to the side wall 4 of the case on the inside thereof. A screw 99 is threaded through the side of the case and bears against the arm 97, whereby the grinding wheel may be brought to bear against the edge of the knife, while a spring 100 turns the wheel away from the knife when the screw is withdrawn. The grinder driving pulley is driven by a belt 101 which passes also around a pulley 102 which is driven frictionally from the gear 58 by a disk 103 (see Fig. 6) fastened to the same shaft with the pulley 102 and adapted to bear against the face of gear 58. Preferably such gear has an annular strip 104 of frictional material fastened to its face arranged in position to be engaged by the disk 103. The shaft of pulley 102 and disk 103 is mounted in an oscillating holder 105 which is secured to a rock shaft 106 having a bearing in a sleeve 107 which forms part of a bracket secured to the web 6. An arm 108 is also secured to the rock shaft 106 and rises therefrom, being drawn toward the web 6 by a spring 109. A cam 110 is arranged to act on the arm 108 and is carried by a stud 111 which passes through the side wall of the case and is fixed to an operating lever 112. The cam may be brought to bear on the arm 108, thereby swinging the same outwardly and turning the rock shaft 106 and holder 105 so as to remove the disk 103 from contact with the gear 58. When the cam 110 is withdrawn, the spring 109 pulls arm 108 so as to bring the disk 103 into contact with the gear 58. In this way the grinder may be driven when necessary to sharpen the knife, and not operated at any other time.

From the foregoing detailed description of construction and arrangement of the parts, it will be understood that when the machine is set in motion by coupling pulley 27 to shaft 28, the cylindrical knife is put in rotation and the feed roll is simultaneously set also in rotation in the direction wherein its upper surface travels toward and under the adjacent part of the knife edge. In so traveling the motion of the feed roll surface is perpendicularly toward the knife. Thereby a piece of leather laid upon the roll is fed squarely against the knife edge. The roll is adjusted for the thickness of the leather and also for that of the skiving to be removed by the nut 67, while the pressure with which it resists downward yielding as the leather is forced under the top gage is determined by adjustments of the screw abutment 64 of spring 62. The width of the stock acted upon by the knife is determined by the adjustable gage 89, or when the greatest possible width of scarf is desired the gage 89 is removed and the width determined by the lip 68, which also prevents the scarf from being cut back from the edge of the piece. The depth of the cut is then regulated by the vertical adjustment of the gage, and the angle of the scarf so produced is determined by the angular adjustment of said top gage. The adjustments of the gage may be made to produce a scarf of any desired bevel from an abrupt bevel to one which is practically parallel to the surface of the leather, and the skived edge may be left to any desired thickness by the vertical adjustment of the gage. The top gage with all of its adjustments may be used in conjunction with the edge gage 89, or with the lip 68, when the gage 89 is removed. When the knife needs sharpening it can be sharpened at any time by simply screwing in the screw 99 and at the same time throwing over the lever 112. When the grinder is not required it may be moved out of operative position and also stopped from rotating. Ample opportunity is provided for adjusting the knife by means of the nut 25 as fast as its substance is removed by grinding the edge, so that no matter how much of the stock of the knife may be ground off, its edge may still always remain over the axis of the feed roll and in substantially the same plane therewith. It will be noted from Fig. 5 that the knife becomes useless when its edge is at a distance from the back plate 14 materially less than the radius of the feed roll. The provision for adjustment is substantially great enough to permit advance of the knife until this plate comes into contact with the feed roll, a position beyond which no possible provision for adjustment could permit it to go.

Thus it will be seen that my invention provides means whereby work may be skived in any manner desired, to any depth, with any degree of bevel, and to any desired extent back from the edge, within the extreme limit established by the length of the feed roll. I am thereby enabled to secure results which accord exactly with predetermined designs and are more accurate and of better appearance than can be obtained by machines previously used.

What I claim and desire to secure by Letters Patent is:

1. A skiving machine comprising in combination, a knife, a feed roll arranged in proximity to said knife, a normally stationary gage arranged oppositely to said feed roll, means for adjusting said gage toward and from the feed roll, and means for adjusting the gage angularly about a point lying in the operative portion of the gage and adjacent to one end thereof.

2. A skiving machine comprising a cylindrical knife having an edge at one end, a normally stationary gage mounted near said edge and having its surface adjacent to the edge approximately concentric therewith, a slide on which said gage is mounted movable in a plane perpendicular to the axis of the knife, and means for moving said slide, said gage being adjustably mounted on said slide for movement angularly about a point approximately in its operative edge.

3. A gaging means for a skiving machine comprising a normally stationary top gage, means for adjusting said top gage angularly about a point approximately in its operative surface, and means for adjusting the said gage bodily in a direction transverse to its operative surface.

4. In a skiving machine, the combination with a rotary cutting knife and means for feeding material toward such knife, of a top gage arranged over said feeding means and across the line in which the work is fed, a gaging stop adjacent to one end of said feeding means extending toward and across an adjacent end of the top gage, means for adjusting said top gage in directions approximately parallel to the gaging stop, and means for adjusting the top gage angularly about a center approximately at the point where said top gage and gaging stop meet.

5. In a skiving machine, the combination of a skiving knife, a feed roll at one side of the edge of said knife and a gage overlying said feed roll at the opposite side of the edge of said knife, an edge stop extending from the end of the feed roll across the adjacent end of the gage, a support for the gage, and means for attaching said gage to said support constructed to permit movement of the gage about an axis substantially coincident with the end of the gage next to the edge stop.

6. In a skiving machine, the combination with a cylindrical knife, of a feed roll located adjacent to the edge of said knife and having its surface longitudinally curved conformably to the adjacent part of the knife edge, an edge stop extending from one end of said roll across the adjacent part of the knife edge, a top gage overlying said roll having one end substantially in contact with said stop, and a guard lying in front of the knife edge adjacent to the opposite end of the roll, whereby the operative extent of the knife edge is limited to the length of the roll.

7. In a skiving machine, a skiving knife, a feed roll bracket crossing the edge of the knife, a feed roll mounted in said bracket and held thereby with its surface close to the edge of the knife at one side thereof and its axis approximately in the same plane with the acting point of such edge, an edge gage fixed on said bracket at one end of the roll and projecting across the knife edge, a top gage on the opposite side of the knife edge from the feed roll and extending from a point in the operative surface of the edge gage approximately parallel with the adjacent surface of the roll, and a holder to which said top gage is clamped in a normally stationary position with capability of adjustment angularly about the end thereof which is nearest said edge gage.

8. In a skiving machine, the combination of a feed roll, a yieldingly mounted holder for said roll, a top gage extending longitudinally of said feed roll, and an edge gage extending transversely of said feed roll in position to engage the edge of a piece passing between the roll and top gage, said edge gage being mounted on said roll holder with provision for adjustment longitudinally of the roll, and the top gage being mounted with provision for adjustment toward and from the roll and also angularly with respect to the axis thereof.

9. A skiving machine comprising a cylindrical knife, an endwise movable shaft to which said knife is secured, means for adjusting said shaft endwise, a driving shaft, intermeshing spiral gears mounted upon said driving shaft and knife shaft respectively, the gear which is on the knife shaft being splined thereto so as to permit relative endwise movement of the shaft, and a holder for preventing said gear from having such movement.

10. A skiving machine comprising a cylindrical knife, a shaft on which said knife is carried and by which it is rotated, a gear mounted upon and driven by said shaft, a second shaft, a gear secured thereto and meshing with the first gear, a feed roll having its axis transverse to the axis of the knife and located close to a part of the edge thereof, and worm and wheel gearing through which said second shaft drives the feed roll.

11. In a skiving machine the combination with a sharp edged cutting knife and a feed roll mounted with its surface close to the edge of said knife and traveling toward such edge, of a top gage located over said roll near the edge of the knife, said roll being arranged to yield away from said gage, and an edge gage arranged to cross the space between said roll and top gage, and so connected with the roll as to move with the latter toward and away from the top gage.

12. In a skiving machine, a cutting knife, a work supporting member yieldingly mounted near the edge of said knife, a top gage extending over said supporting member, an edge stop extending from one end of said supporting member across one end of said top gage and being in substantially the same plane therewith, and means for adjusting the top gage angularly about the end thereof which is nearest to said end stop.

13. In a skiving machine, a cutting knife, a work supporting member yieldingly mounted near the edge of said knife, a top gage extending over said supporting member, an edge stop extending from one end of said supporting member across one end of said top gage and being in substantially the same plane therewith, means for adjusting the top gage angularly about the end thereof which is nearest to said end stop, and means for adjusting said top gage bodily toward and away from said supporting member in a direction substantially parallel to said stop.

14. A work guiding means for a skiving machine, comprising in combination a feed roll, a holder for said feed roll, an edge stop connected to said holder close to an end of said roll and extending beyond the periphery of the roll at such end, a top gage having one end in substantial contact with said edge stop, and an edge gage mounted detachably and adjustable on said roll holder and extending into close proximity to the top gage and to the adjacent surface of the roll and across the space between said top gage and said surface.

15. In a skiving machine, a feed roll, a top gage extending longitudinally of the roll close to the operative surface thereof, means for adjusting said top gage angularly about one end thereof in a plane approximately radial to the roll, and a gaging stop in such close proximity to the pivot end of the top gage and the corresponding ends of the roll as to be substantially in contact therewith, said stop being also in the plane of angular adjustment of the top gage.

16. In a skiving machine, a feed roll, a top gage extending longitudinally of the roll close to the operative surface thereof, means for adjusting said top gage angularly about one end thereof in a plane approximately radial to the roll, and a gaging stop in such close proximity to the pivot end of the top gage and the corresponding ends of the roll as to be substantially in contact therewith, said roll being independently mounted and arranged to be separable from the top gage against yielding resistance, and the said stop being carried with the roll in its movements toward and away from the top gage.

In testimony whereof I have affixed my signature, in presence of two witnesses.

HAROLD A. BROWN.

Witnesses:
  WILLIAM J. CALLAHAN,
  JAMES H. DUNPHY.